US012691694B2

(12) United States Patent
Ito et al.

(10) Patent No.: US 12,691,694 B2
(45) Date of Patent: Jul. 28, 2026

(54) DRYING APPARATUS, AND IMAGE FORMING APPARATUS EQUIPPED WITH THE SAME

(71) Applicant: CANON KABUSHIKI KAISHA, Tokyo (JP)

(72) Inventors: Akihiro Ito, Chiba (JP); Makoto Matsuo, Ibaraki (JP); Yuri Shimamoto, Chiba (JP); Hiroki Kajita, Saitama (JP); Yushi Sadamitsu, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 136 days.

(21) Appl. No.: 18/888,407

(22) Filed: Sep. 18, 2024

(65) Prior Publication Data

US 2025/0115059 A1 Apr. 10, 2025

(30) Foreign Application Priority Data

Oct. 5, 2023 (JP) ................................ 2023-173856

(51) Int. Cl.
*B41J 11/00* (2006.01)
*B41J 13/08* (2006.01)
*B41J 29/13* (2006.01)
*B65H 5/02* (2006.01)

(52) U.S. Cl.
CPC .......... *B41J 11/0022* (2021.01); *B41J 11/007* (2013.01); *B41J 13/08* (2013.01); *B41J 29/13* (2013.01); *B65H 5/021* (2013.01); *B65H 2402/31* (2013.01); *B65H 2404/2693* (2013.01); *B65H 2601/324* (2013.01)

(58) Field of Classification Search
CPC ...... B41J 11/0022; B41J 11/007; B41J 13/08; B41J 29/13; B65H 5/021; B65H 2402/31; B65H 2404/2693; B65H 2601/324
See application file for complete search history.

(56) References Cited

U.S. PATENT DOCUMENTS 12,415,370 B2 * 9/2025 Naramatsu ........... B41J 11/0021
2004/0109054 A1 * 6/2004 Martin ................. B41J 11/0022 347/102
2010/0103237 A1 * 4/2010 Hara .................. B41J 11/00244 347/102
2010/0149297 A1 * 6/2010 Kanada .................... B41J 2/175 347/102

FOREIGN PATENT DOCUMENTS

JP H0396973 A 4/1991

* cited by examiner

*Primary Examiner* — Henok D Legesse
(74) *Attorney, Agent, or Firm* — ROSSI, KIMMS & McDOWELL LLP

(57) ABSTRACT

A drying apparatus includes a conveyance apparatus, and an air blowing unit disposed above the conveyance unit. The air blowing unit includes a first pivot shaft that extends in a conveyance direction of the sheet. The conveyance apparatus includes a conveyance unit including a belt, and a plurality of stretching rollers, and a pivoting mechanism configured to pivot the conveyance unit about the second pivot shaft between a first position and a second position that differs from the first position. In a state where the air blowing unit is at the open position and the conveyance unit is positioned at the second position, the conveyance unit is configured to be drawn out to a rotational axis direction of the stretching rollers.

12 Claims, 8 Drawing Sheets

DRYING APPARATUS, AND IMAGE FORMING APPARATUS EQUIPPED WITH THE SAME

BACKGROUND OF THE INVENTION

Field of the Invention

The present invention relates a drying apparatus, and an image forming apparatus equipped with the drying apparatus.

Description of the Related Art

Japanese Patent Application Laid-Open Publication No. H03-96973 discloses an image forming apparatus equipped with a sheet conveyance apparatus adopting a sheet conveyance belt in which a rotating belt is used to convey sheets. The sheet conveyance apparatus includes a belt conveyance unit for conveying sheets, and the belt conveyance unit is detachably attached to an inner side of a casing.

In order to realize printing with a high image quality and a high productivity in the digital commercial printing market, an industrial inkjet recording apparatus is used widely as the image forming apparatus. According to the industrial inkjet recording apparatus, a printing module for performing an image forming process, a drying module for performing a drying process, and a fixing module for performing a fixing process are provided in different casings, wherein each of the casings are connected in a manner capable of handing over sheets. In the respective modules, the sheets are conveyed on a belt conveying unit provided in each casing, and handed over from one casing to another casing.

SUMMARY OF THE INVENTION

According to one aspect of the present invention, a drying apparatus includes a conveyance apparatus configured to convey a sheet, and an air blowing unit disposed above the conveyance apparatus in a vertical direction and configured to blow air onto the sheet. The air blowing unit includes a first pivot shaft that extends in a conveyance direction of the sheet, the air blowing unit configured to pivot about the first pivot shaft to move to an open position where the conveyance apparatus is exposed and a closed position where the conveyance apparatus is covered. The conveyance apparatus includes a conveyance unit including a belt having an endless shape and configured to convey the sheet, and a plurality of stretching rollers on which the belt is stretched, and a pivoting mechanism including a second pivot shaft, the pivoting mechanism configured to pivot the conveyance unit about the second pivot shaft between a first position and a second position that differs from the first position. In a state where the air blowing unit is at the closed position, the conveyance unit is positioned at the first position, and in a state where the air blowing unit is at the open position, the conveyance unit is movable between the first position and the second position. In a state where the air blowing unit is at the open position and the conveyance unit is positioned at the second position, the conveyance unit is configured to be drawn out to a rotational axis direction of the stretching rollers.

Further features of the present invention will become apparent from the following description of exemplary embodiments with reference to the attached drawings.

DESCRIPTION OF THE EMBODIMENTS

Embodiments of the present invention will be described below with reference to the drawings. At first, an image forming apparatus according to the present embodiment will be described with reference to FIG. 1. In the description, an inkjet recording apparatus 100 of a so-called sheet-by-sheet type for forming images on sheets using ink and reaction liquid will be described as an example of the image forming apparatus. The sheet may be any recording material capable of receiving application of ink, including paper such as normal paper and thick paper, a plastic film such as an overhead projector sheet, a special-shaped sheet such as an envelope or an index paper, and cloth.

Figure 1:
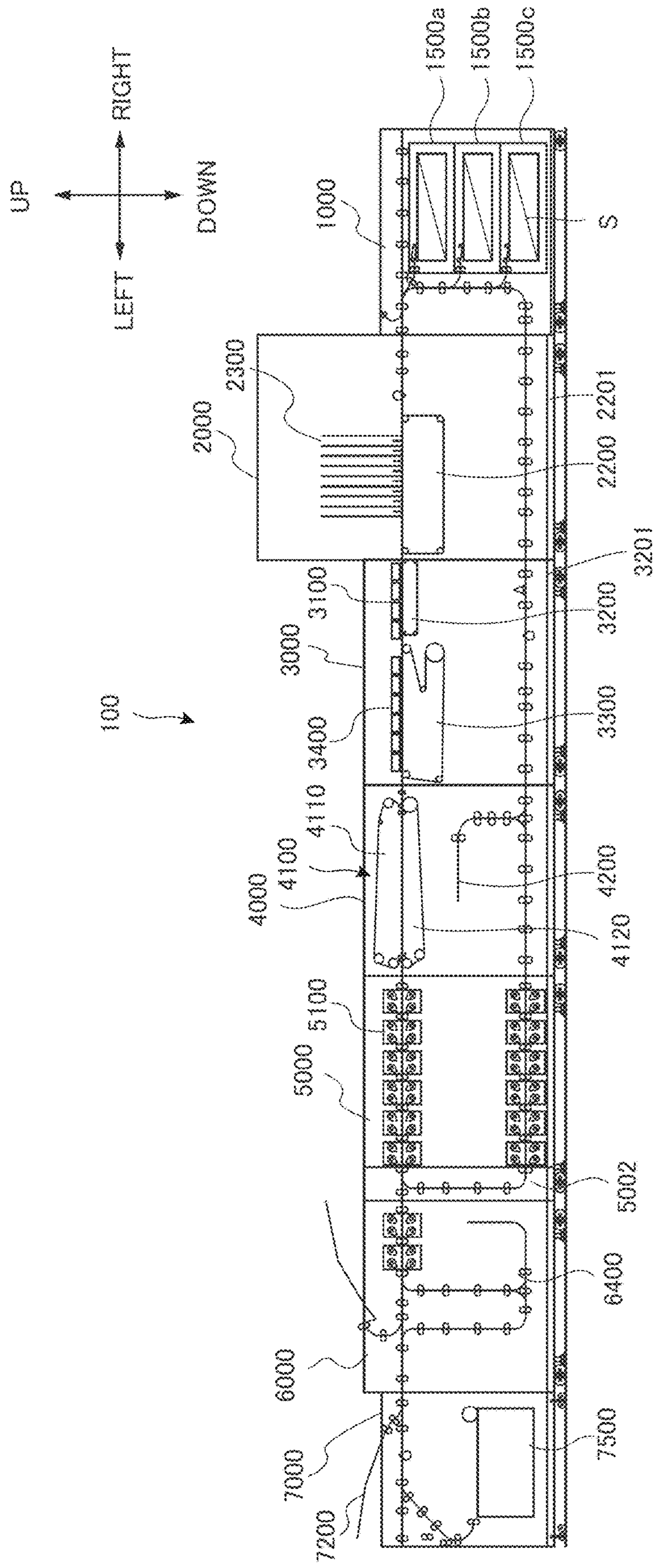
FIG. 1 is a schematic view illustrating an inkjet recording apparatus.

Further, in the present specification, a side on which an operator stands when operating the inkjet recording apparatus 100 is called a "front side, or front", and the side opposite thereto is called a "rear side, or back". Further, a left side viewed from the front side is called "left", and a right side viewed from the front side is called "right". FIG. 1 illustrates a state where the inkjet recording apparatus 100 is viewed from a front side.

Inkjet Recording Apparatus

As illustrated in FIG. 1, the inkjet recording apparatus 100 is equipped with a sheet feeding module 1000, a printing module 2000, a drying module 3000, a fixing module 4000, a cooling module 5000, a reversing module 6000, and a supporting module 7000. A sheet S supplied from the sheet feeding module 1000 is subjected to various processes while being conveyed in the respective modules along a conveyance path and finally discharged to the supporting module 7000.

Each of the sheet feeding module 1000, the printing module 2000, the drying module 3000, the fixing module 4000, the cooling module 5000, the reversing module 6000, and the supporting module 7000 have individual casings, and the casings are connected together to form the inkjet recording apparatus 100. For example, a casing 2201 of the printing module 2000 and a casing 3001 of the drying module 3000 are connected in a manner capable of handing over the sheet S.

The sheet feeding module 1000 has storage cassettes 1500*a*, 1500*b*, and 1500*c* for storing the sheets S, and the storage cassettes 1500*a* to 1500*c* may be drawn out to the front side to store the sheets S. The sheets S are fed one sheet at a time from the respective storage cassettes 1500*a* to 1500*c* via a separation belt and a conveyance roller, and conveyed to the printing module 2000. The number of storage cassettes 1500*a* to 1500*c* is not limited to three, and it may be one, two, or even more than four.

The printing module 2000 includes a pre-image-forming conveyance unit (not shown), a printing belt unit 2200, and a storage unit 2300. The sheet S conveyed from the sheet feeding module 1000 is sent to the pre-image-forming conveyance unit, where the sheet S is subjected to skew correction and position correction, and then conveyed to the printing belt unit 2200.

The storage unit 2300 is arranged at a position facing the printing belt unit 2200 with respect to the conveyance path of the sheet S. The storage unit 2300 serving as an image forming unit ejects ink onto the sheet S via a plurality of recording heads from above the sheet S being conveyed on the printing belt, and forms an image. A clearance between the sheet S and the recording heads is ensured by having the sheet S sucked while being conveyed on the printing belt unit 2200. According to the present embodiment, a total of five line-type recording heads, which correspond to four colors of yellow (Y), magenta (M), cyan (C), and black (Bk), and reaction liquid, are arranged along a conveyance direction of the sheet S, i.e., arrow X direction.

The number of colors of the ink and the number of recording heads are not limited to five. An inkjet system used to eject ink may adopt a system using heating elements, a system using piezoelectric elements, a system using electrostatic elements, or a system using Micro Electro Mechanical Systems (MEMS) elements. The inks of respective colors are supplied from ink tanks not shown through respective ink tubes to the recording heads. The ink contains, with the total mass of ink set as reference, "0.1 mass % to 20.0 mass %" of resin component, and water, water-soluble organic solvent, coloring material, wax, and additives.

An inline scanner not shown is arranged downstream in a conveyance direction of the storage unit 2300. The sheet S on which image is formed in the storage unit 2300 is conveyed by the printing belt unit 2200 to an inline scanner (not shown), and image formed on the sheet S is read by the inline scanner (not shown). During this process, deviation and color density of the image formed on the sheet S is detected, and based on the deviation and color density of the image, correction of image and density formed on the sheet S is performed.

The drying module 3000 serving as a sheet conveyance apparatus includes a cool air blowing unit 3100, a decoupling belt unit 3200, a drying belt unit 3300, and a warm air blowing unit 3400. The drying module 3000 reduces a liquid portion of the ink applied to the sheet S to enhance a fixing property of the ink to the sheet S by the subsequent fixing module 4000.

The sheet S on which the image has been formed is conveyed to the decoupling belt unit 3200 arranged within the casing of the drying module 3000. In the decoupling belt unit 3200 serving as a conveyance unit, frictional force is generated between the sheet S and the belt by wind pressure of cool air blown from above, and the sheet S is conveyed on the belt. By having the sheet S placed on the belt conveyed by friction force in this manner, it may be possible to prevent displacement of the sheet S when the sheet S is conveyed from a printing belt unit 2010 to the decoupling belt unit 3200.

The sheet S conveyed from the decoupling belt unit 3200 is sucked and conveyed on the drying belt unit 3300, and the ink applied to the sheet S is dried by having warm air blown from the warm air blowing unit 3400 arranged above the belt. By having the ink applied on the sheet S heated by the drying module 3000 and evaporation of moisture promoted, it may be possible to suppress the occurrence of a so-called cockling in which ink is scattered on the sheet S and a line that forms a frame-like mark around the ink is created. Any device capable of heating and drying may be used as the drying module 3000, but it is preferable to use a warm air drier or a heater, for example. The heater preferably realizes heating, for example, by a heating wire or an infrared heater, from the viewpoint of safety and energy efficiency.

The fixing module 4000 includes a fixing belt unit 4100. The fixing belt unit 4100 fixes the ink on the sheet S by having the sheet S conveyed from the drying module 3000 pass through between an upper belt unit 4110 and a lower belt unit 4120 being heated.

The cooling module 5000 includes a cooling portion 5100, and cools the sheet S heated to high temperature conveyed from the fixing module 4000. The cooling portion 5100 cools the sheet S by increasing the pressure inside a cooling box by taking in outer air to the cooling box using a fan and blowing cool air through the nozzle formed on the conveyance guide to the sheet S. The cooling portion 5100 is arranged on both sides of the conveyance path of the sheet S so as to cool the sheet S from both sides.

Further, the cooling module 5000 has a conveyance path switching portion 5002 disposed therein. The conveyance path switching portion 5002 switches the conveyance path of the sheet S corresponding to a case where the sheet S is conveyed to the reversing module 6000 and to a case where the sheet S is conveyed to a duplex conveyance path for performing duplex printing in which images are formed on both sides of the sheet S.

The reversing module 6000 includes a reverse portion 6400. The reverse portion 6400 reverses the upper and lower sides of the sheet S being conveyed, and reverses the side of the sheet S facing upward when the sheet is discharged to the supporting module 7000. The supporting module 7000 includes a top tray 7200 and a supporting portion 7500, and supports the sheet S conveyed from the reversing module 6000 thereon.

During duplex printing, the sheet S is conveyed by the conveyance path switching portion 5002 to a conveyance path disposed on the lower portion of the cooling module 5000. Thereafter, the sheet S is passed through the duplex conveyance path in the fixing module 4000, the drying module 3000, the printing module 2000, and the sheet feeding module 1000 to be returned to the printing module 2000. A reverse portion 4200 for reversing the sides of the sheet S is disposed on a duplex conveyance portion of the fixing module 4000. The sheet S returned to the printing module 2000 has an image formed by ink on the other side surface where image has not yet been formed, and the sheet S is conveyed through the drying module 3000, the fixing module 4000, the cooling module 5000, and the reversing module 6000 to be discharged to the supporting module 7000.

Drying Module

Figure 2A:
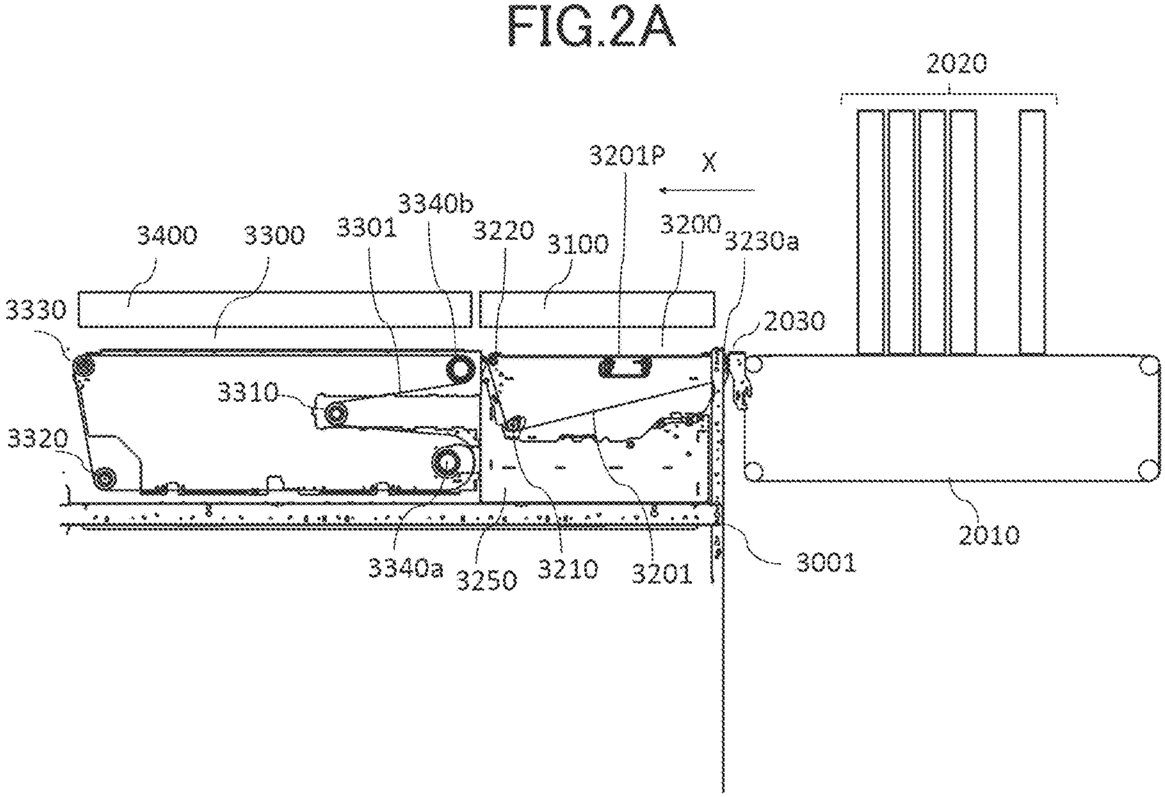
FIG. 2A is a schematic diagram illustrating a printing module and a drying module.
Figure 2B:
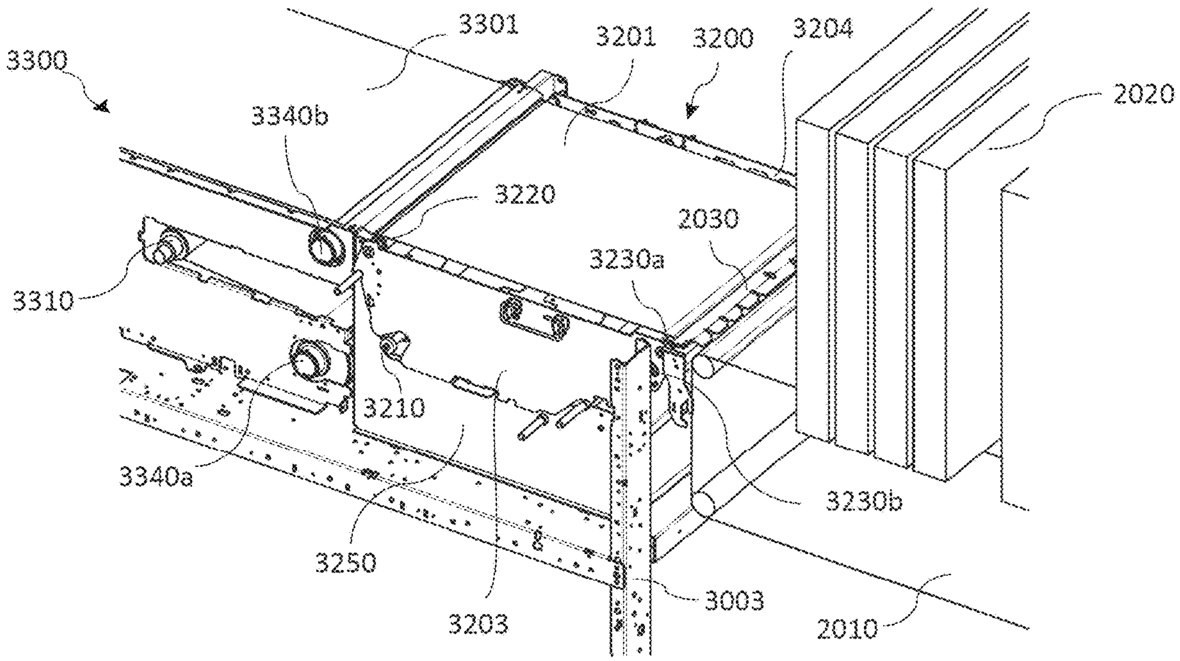
FIG. 2B is an enlarged perspective view illustrating the printing module and the drying module.

Next, a configuration of the drying module 3000 will be described with reference to FIGS. 2A to 3. As illustrated in FIGS. 2A and 2B, the sheet S on which image has been formed by the printing module 2000 is passed through a sheet transfer guide 2030 to the decoupling belt unit 3200 of the drying module 3000. As described in detail later, the decoupling belt unit 3200 is supported in an attachable/detachable manner to a supporting portion 3250 fixed to the casing 3001.

The decoupling belt unit 3200 includes a decoupling belt 3201 having an endless shape, and a driving roller 3220, a steering roller 3210, and stretching rollers 3230*a* and 3230*b* across which the decoupling belt 3201 is rotatably stretched. The decoupling belt 3201 is rotated by the driving roller 3220 which is driven to rotate by a motor not shown.

In the present embodiment, regarding a conveyance direction, i.e., arrow X direction, of the sheet S, the driving roller 3220 serving as a first roller stretches and drives the decoupling belt 3201 at a position downstream of a sheet conveyance surface 3201P of the decoupling belt 3201 for conveying the sheet S. The stretching roller 3230*a* serving as a second roller stretches the decoupling belt 3201 at a position upstream of the sheet conveyance surface 3201P.

The decoupling belt unit 3200 includes a front side plate 3203 arranged on a front side, and a rear side plate 3204 arranged on a rear side interposing the decoupling belt 3201. The driving roller 3220, the stretching rollers 3230*a* and 3230*b*, and the steering roller 3210 are axially supported rotatably on the front side plate 3203 and the rear side plate 3204. However, the steering roller 3210 is axially supported such that a first end thereof is displaceable in a predetermined direction along a rail not shown, and urges the decoupling belt 3201 from an inner side toward an outer side by an urging force applied from a tension spring (not shown). Although it is not shown in the drawing, a second end of the steering roller 3210 is supported by a steering arm that pivots. Further, an edge sensor for detecting an end portion position of the decoupling belt 3201 is arranged on a conveyance path of the sheet S. Based on a detection result of the edge sensor, the steering arm is pivoted by controlling an amount of rotation of a steering motor having a steering eccentric cam. Thereby, meandering of the decoupling belt 3201 in the rotational axis direction may be suppressed.

In the decoupling belt unit 3200, a frictional force is generated between the sheet S and the decoupling belt 3201 by a wind pressure of cool air blown from the cool air blowing unit 3100 arranged above the decoupling belt unit 3200, and the sheet S is conveyed on the decoupling belt 3201. The decoupling belt 3201 has a number of holes formed thereon, and the cool air from the cool air blowing unit 3100 that is blown to areas other than the sheet S escape therethrough on a sheet conveyance surface 3301P on which the sheet S is conveyed of the decoupling belt 3201.

The sheet S conveyed by the decoupling belt unit 3200 is sent to the drying belt unit 3300. The drying belt unit 3300 includes a drying belt 3301 having an endless shape, and a driving roller 3330, heating rollers 3340*a* and 3340*b*, a tension roller 3310, and a steering roller 3320 across which the drying belt 3301 is stretched. The drying belt 3301 is driven to rotate by the driving roller 3330.

In the drying module 3000, warm air heated by a heater is blown from the warm air blowing unit 3400 arranged on an upper portion of the drying belt unit 3300 toward the drying belt unit 3300. Further, although not shown, a suction unit is disposed on an inner side of the drying belt 3301, and the suction unit generates negative pressure to a suction portion that discharges air to an air discharge duct.

Since a number of small holes having a diameter of approximately "φ0.4 mm" is formed on the drying belt 3301, force for sucking the sheet S to the drying belt 3301 on the suction unit is generated. Due to this sucking force and a wind pressure from the warm air blowing unit 3400, the sheet S is conveyed on the drying belt 3301.

In the process of conveying the sheet S, ink is dried by the heat from the drying belt 3301, in addition to the blowing of warm air from the warm air blowing unit 3400. Heating of the drying belt 3301 is performed by the heating roller 3340*a* and the heating roller 3340*b*. Heaters are disposed in the inner side of the heating rollers 3340*a* and 3340*b*, and the heating of the heater causes the temperature of the heating rollers 3340*a* and 3340*b* to rise, by which the drying belt 3301 is heated. Temperature detection sensors (not shown) for detecting temperature are arranged on the heating rollers 3340*a* and 3340*b*, and the heating rollers 3340*a* and 3340*b* are controlled to set temperatures by having the heater controlled based on the detection result of the temperature detection sensor.

The tension roller 3310 is disposed movably in right-left directions by a tensioner unit not shown, and urges the drying belt 3301 toward the driving roller 3330, the heating rollers 3340*a* and 3340*b*, and the steering roller 3320 with appropriate tension. The steering roller 3320 is supported by a steering arm (not shown) that pivots. Based on a detection result of an edge sensor (not shown) that detects the end portion position of the drying belt 3301, meandering of the drying belt 3301 in the rotational axis direction is regulated by the steering roller 3320, similar to the decoupling belt 3201 described above.

Figure 3:
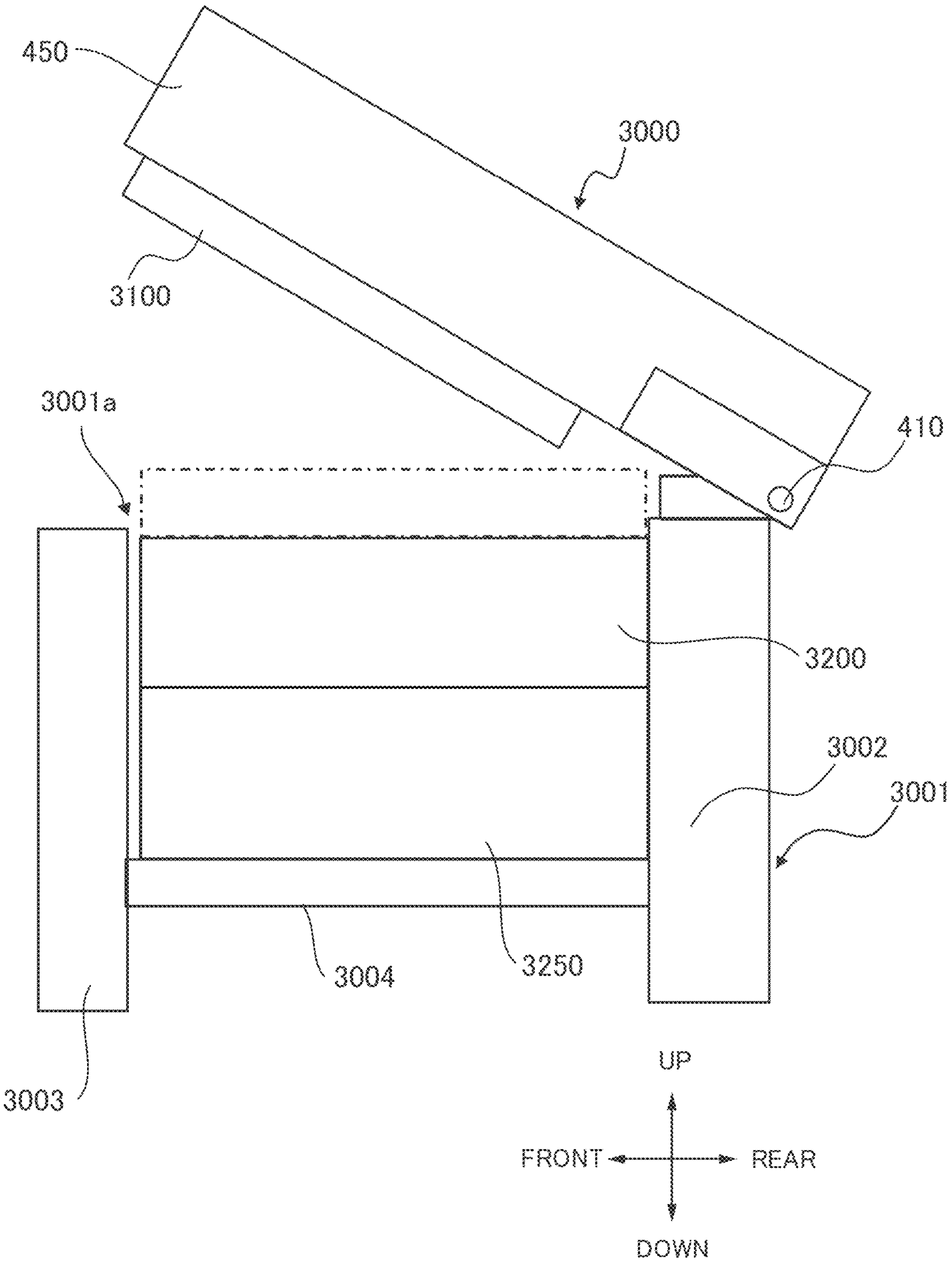
FIG. 3 is a schematic diagram illustrating a top cover.

As illustrated in FIG. 3, according to the present embodiment, the operator may open an opening portion 3001*a* of the casing 3001 by pivoting a top cover 450 disposed on the casing 3001 of the drying module 3000. The top cover 450 is disposed pivotably with respect to the casing 3001 of the drying module 3000 with a cover pivot shaft 410, i.e., third pivot shaft, disposed on a rear side serving as a pivot axis. The cool air blowing unit 3100 is arranged on the top cover 450, and the cool air blowing unit 3100 is moved integrally with the top cover 450. In this state, the decoupling belt unit 3200 remains on the casing 3001 side. That is, the decoupling belt unit 3200 is exposed.

Along with the opening and closing of the top cover 450, the cool air blowing unit 3100 moves between a proximity position (illustrated by the dotted line in the drawing) capable of blowing cool air efficiently toward the decoupling belt unit 3200 and a separated position (illustrated by the solid line in the drawing) where it is separated from the decoupling belt unit 3200. In a state where the top cover 450 is opened and the cool air blowing unit 3100 is at the separated position, in a case of occurrence of a so-called jamming in which the sheet S remains on the decoupling belt 3201, the operator may remove the sheet S remaining on the decoupling belt 3201. According to the present embodiment, the top cover 450 including the cool air blowing unit 3100 is supported pivotably at the rear side, such that a configuration is adopted where the front side of the top cover 450 may be opened toward the upper direction to allow the operator to work from the front side.

In a state where the top cover 450 is opened, the decoupling belt unit 3200 remains within the casing 3001. As described in detail below, the decoupling belt unit 3200 is supported pivotably and movably in sliding motion on the supporting portion 3250. The casing 3001 includes vertical frames 3002 and 3003 that extend in a direction, i.e., in the up-down direction, intersecting a rotational axis direction of the driving roller 3220 and the stretching rollers 3230*a* and 3230*b*, and a partition plate 3004 that is fixed to an intermediate area of the vertical frames 3002 and 3003 and that separates the space within the casing 3001 into upper and lower parts. The supporting portion 3250 is placed on the partition plate 3004 and fixed to the vertical frames 3002 and 3003 or the partition plate 3004 as required, for example by screws.

The decoupling belt unit 3200 is arranged such that a portion thereof is overlapped within the casing 3001 with a vertical frame 3003 disposed upstream in the conveyance direction of the casing 3001 when viewed from the front side (refer to FIG. 4 described below). This is to minimize the clearance between the decoupling belt unit 3200 and the printing belt unit 2200 so as to prevent conveyance failure of the sheet S between the printing belt unit 2200 and the decoupling belt unit 3200 serving as conveyance portions. Further, since the present arrangement enables the casing 3001 to be downsized, the arrangement contributes to downsizing the inkjet recording apparatus 100.

In order to perform maintenance and replacement operations, it may be possible to allow the decoupling belt unit 3200 to be detached and attached from the right side of the casing 3001, i.e., first casing. However, in such a configuration, the operator must disengage the connection between the casing 3001 and the casing 2201, i.e., second casing, of the printing module 2000, and to move the casing 3001 itself to the front side, which is time-consuming and requires much work, such that it is not easily adopted. Therefore, it is preferable that the decoupling belt unit 3200 is detachably attached to the casing 3001 from the front side, where the operator may work easily. However, as described above, a part of the decoupling belt unit 3200 is overlapped with the vertical frame 3003, such that in this state, the vertical frame 3003 will get in the way when the operator attempts to attach/detach the decoupling belt unit 3200 to/from the front side.

Further, it may be possible to allow the decoupling belt unit 3200 to be attached and detached through the opening portion 3001*a* of the casing 3001 opened by opening the top cover 450. However, since the cool air blowing unit 3100 is disposed on the top cover 450, when inserting or removing the decoupling belt unit 3200 through the opening portion 3001*a*, the decoupling belt unit 3200 may collide against and damage the cool air blowing unit 3100. Further, since the opening of the opening portion 3001*a* is narrowed, the operator must lift the decoupling belt unit 3200 within the casing 3001 and change its position when removing the same through the opening portion 3001*a*, but since the decoupling belt unit 3200 is large and heavy, the operability is not good.

According to the present embodiment, a portion of the decoupling belt unit 3200 is overlapped with the vertical frame 3003, but the decoupling belt unit 3200 is attachable and detachable from a front side where the operator may easily perform maintenance and replacement operations. In order to realize such a configuration, the decoupling belt unit 3200 is supported pivotably and slidably on the supporting portion 3250 so as to avoid the vertical frame 3003.

Decoupling Belt Unit and Supporting Portion

Figure 5:
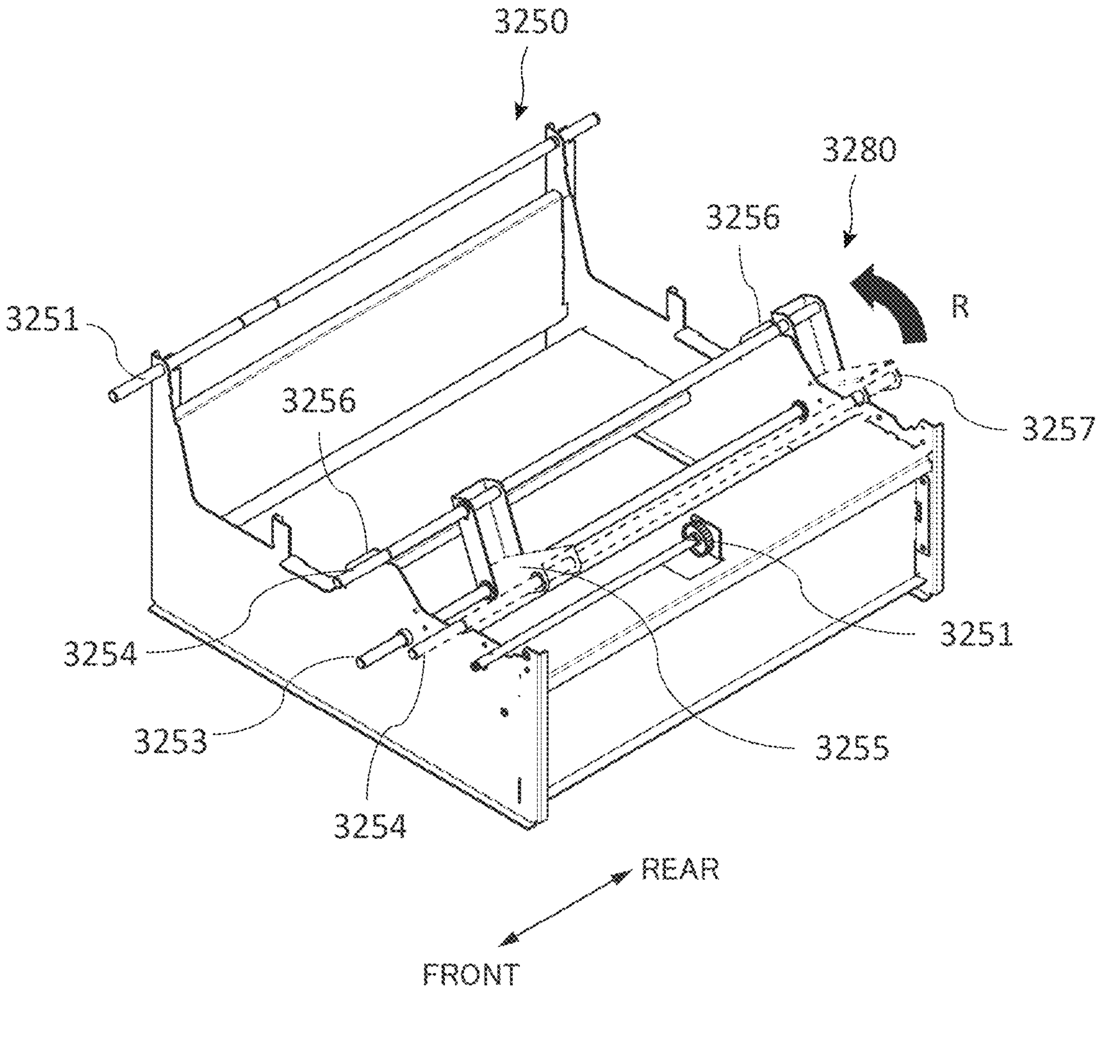
FIG. 5 is a perspective view illustrating a supporting portion.
Figure 6:
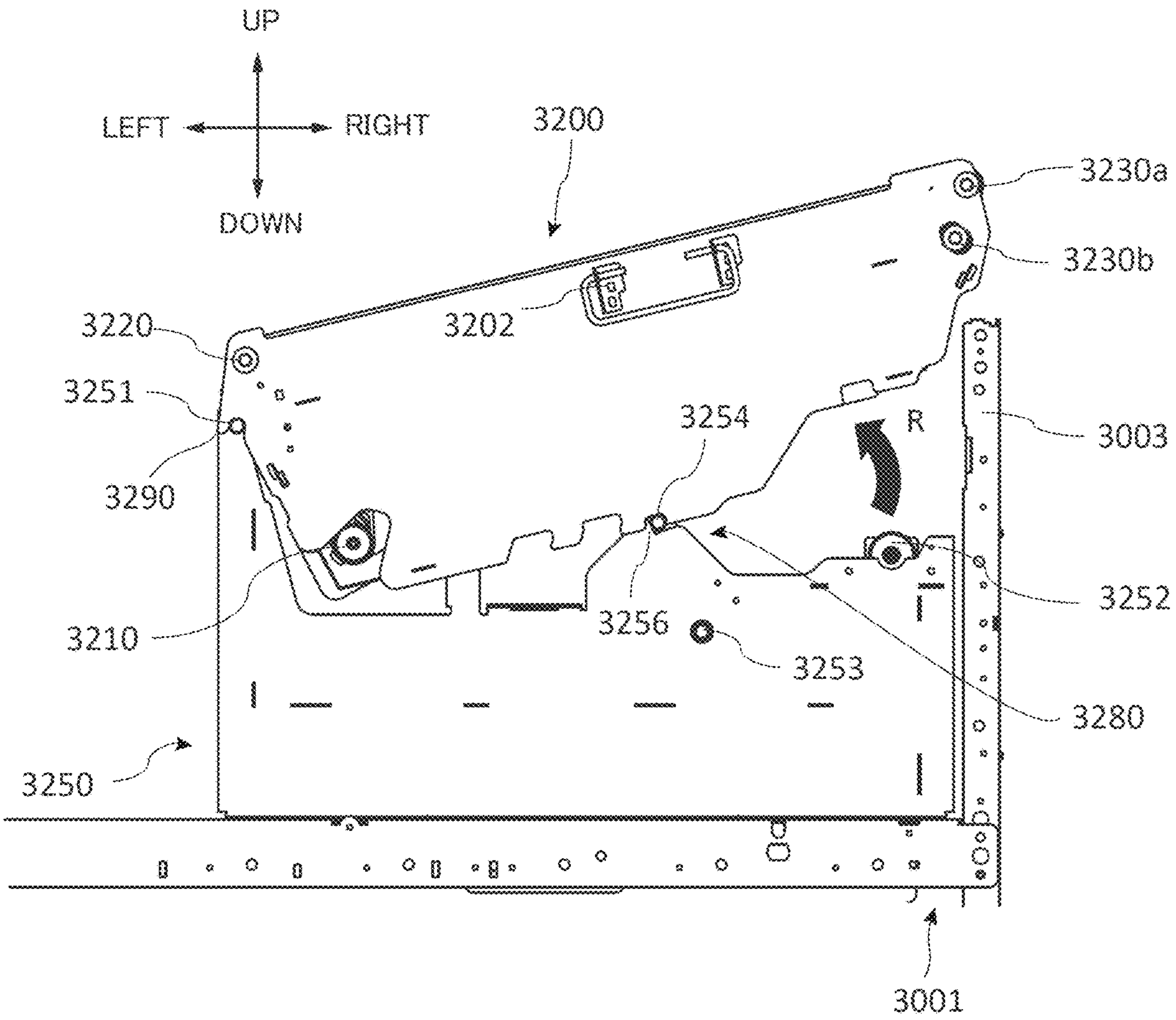
FIG. 6 is a left side view illustrating a state in which the decoupling belt unit is at a second position.
Figure 7:
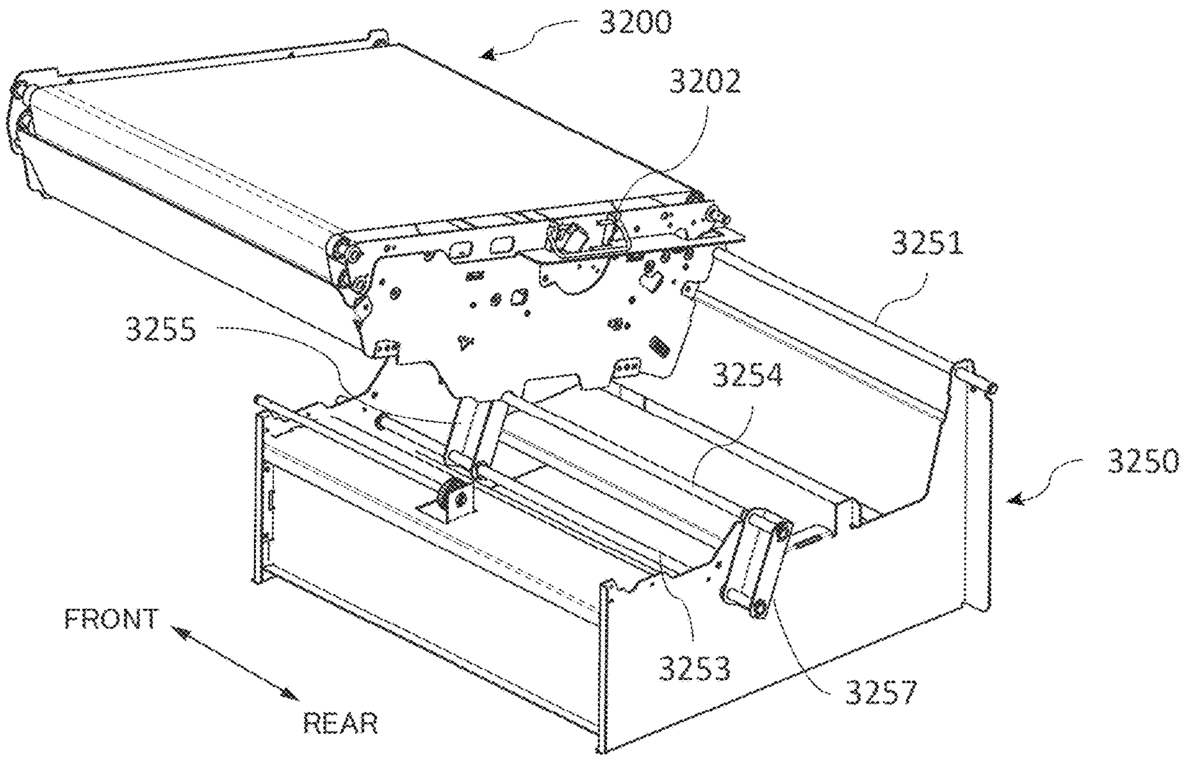
FIG. 7 is a view illustrating a sliding movement of the decoupling belt unit.

The decoupling belt unit 3200 and the supporting portion 3250 according to the present embodiment will be described based on FIGS. 4 to 7 with reference to FIG. 3. FIG. 4 illustrates a state where the decoupling belt unit 3200 is at a first position. FIG. 5 illustrates the supporting portion 3250. FIG. 6 illustrates a state where the decoupling belt unit 3200 is at a second position where the decoupling belt unit 3200 is retreated upward in a direction intersecting the rotational axis direction in the first position such that the decoupling belt unit 3200 is not overlapped with the vertical frame when viewed in the rotational axis direction in the first position. FIG. 7 is a view illustrating the sliding movement of the decoupling belt unit 3200. In the present specification, regarding the position of the decoupling belt unit 3200 with respect to the supporting portion 3250, the position during image formation is referred to as the first position, and the position where the decoupling belt unit 3200 is movable in sliding motion toward the front side is referred to as the second position.

As described above, the cool air blowing unit 3100, i.e., air blowing unit, arranged on the top cover 450 is moved integrally with the top cover 450 and pivots about the cover pivot shaft 410. The cool air blowing unit 3100 is movable between an open position where the opening portion 3001*a* through which is exposed the decoupling belt unit 3200 positioned at the first position is opened, and a closed position where the decoupling belt unit 3200 positioned at the first position is covered. When the cool air blowing unit 3100 is positioned at the open position, the decoupling belt unit 3200 is movable from the first position to the second position.

Figure 4:
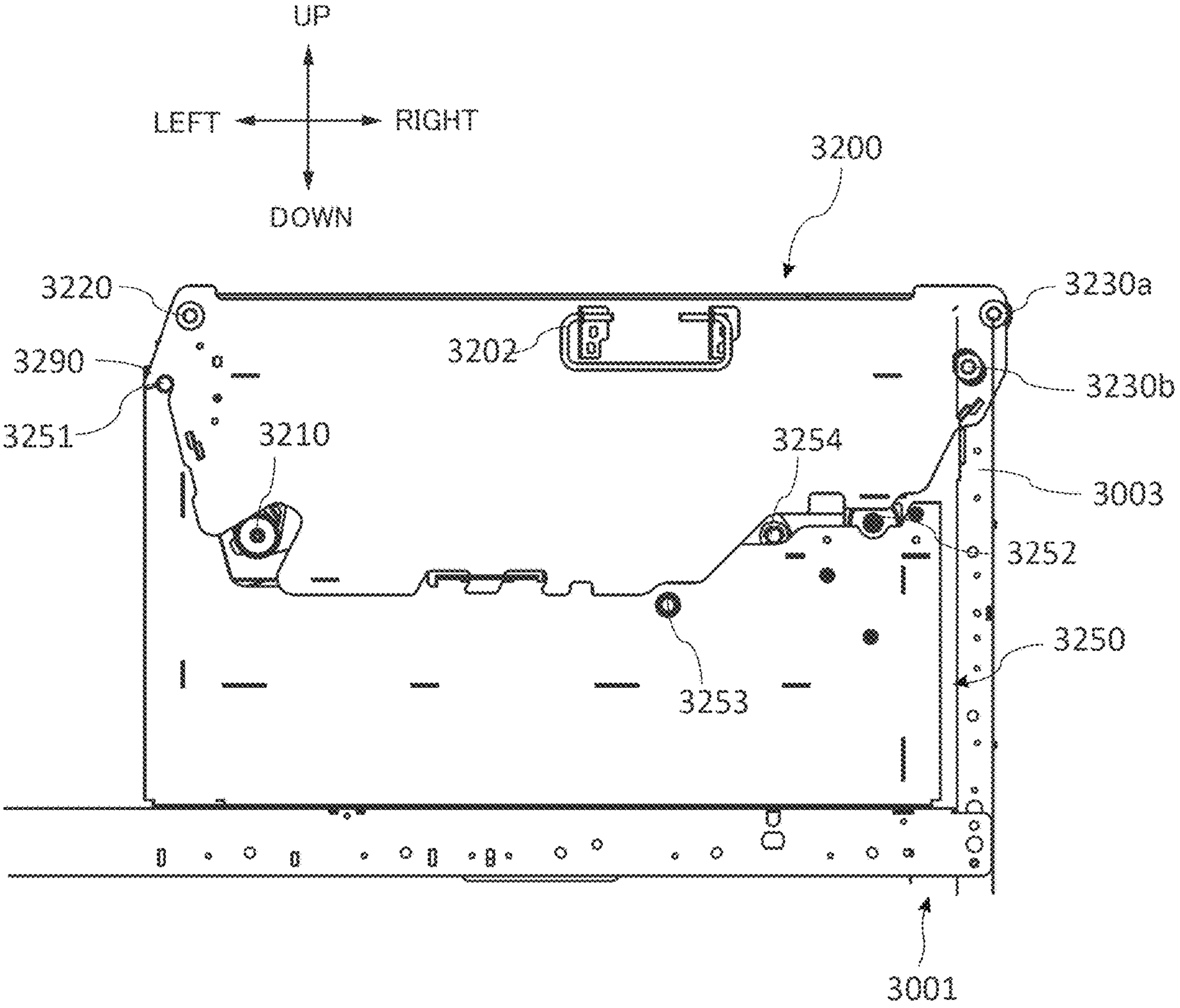
FIG. 4 is a left side view illustrating a state in which a decoupling belt unit is at a first position.

As illustrated in FIG. 4, the supporting portion 3250 includes a pivot support shaft 3251, i.e., first pivot shaft, arranged downstream in the conveyance direction. A first end portion of the pivot support shaft 3251 protrudes from the supporting portion 3250 on the front side, and a second end portion thereof protrudes from the supporting portion 3250 on the rear side (refer to FIG. 5). That is, the pivot support shaft 3251 is fixed in a state inserted to the through holes of the supporting portion 3250 such that the first end portion thereof protrudes from the supporting portion 3250 on the front side and the second end portion thereof protrudes from the supporting portion 3250 on the rear side.

Meanwhile, hook portions 3290 that engage pivotably with each of the first end portion and the second end portion of the pivot support shaft 3251 being protruded are formed on the front side plate 3203 and the rear side plate 3204 of the decoupling belt unit 3200. Each of the hook portions 3290 serves as a engage portion of the decoupling belt unit 3200. The decoupling belt unit 3200 is supported by the pivot support shaft 3251 via the hook portion 3290 and pivots about the pivot support shaft 3251. As described below, the hook portions 3290 are engaged with the pivot support shaft 3251 in such a manner as to allow the decoupling belt unit 3200 to move in sliding motion toward the front side along the pivot support shaft 3251. The hook portions 3290 serving as engagement portions are engaged on the rear side with the pivot support shaft 3251 on the inner side of the supporting portion 3250 and engaged on the front side with the pivot support shaft 3251 on the outer side of the supporting portion 3250. The engagement between the hook portions 3290 and the pivot support shaft 3251 may be released simply by the operator lifting up the decoupling belt unit 3200. As described, the decoupling belt unit 3200 is disposed in an attachable/detachable manner on the supporting portion 3250.

As illustrated in FIG. 5, a pivot mechanism 3280 for pivoting the decoupling belt unit 3200 about the pivot support shaft 3251 is disposed on the supporting portion 3250. In FIG. 5, the dotted line illustrates a state of the pivot mechanism 3280 when the decoupling belt unit 3200 is at the first position, and the solid line illustrates a state of the pivot mechanism 3280 when the decoupling belt unit 3200 is at the second position. The pivot mechanism 3280 includes an insertion-extraction pivot shaft 3253, i.e., second pivot shaft, an insertion-extraction support shaft 3254, and a connecting link 3255 serving as a connecting portion for connecting the aforementioned shafts. The insertion-extraction pivot shaft 3253 is pivotably inserted to the through holes on the supporting portion 3250 such that a first end portion thereof protrudes from the supporting portion 3250 on the front side and a second end portion thereof protrudes from the supporting portion 3250 on the rear side.

The insertion-extraction support shaft 3254 is connected by the insertion-extraction pivot shaft 3253 and the connecting link 3255. The connecting link 3255 connects the insertion-extraction support shaft 3254 and the insertion-extraction pivot shaft 3253 at the inner side of the supporting portion 3250. Therefore, the insertion-extraction support shaft 3254 pivots via the connecting link 3255 about the insertion-extraction pivot shaft 3253 serving as the pivot axis. The insertion-extraction support shaft 3254 supports the decoupling belt unit 3200 on an upstream side from the center with respect to the conveyance direction of the sheet S.

The pivot mechanism 3280 is operated by the operator. Therefore, an operation portion 3257 through which an operator, or user, may operate the pivot mechanism 3280 is disposed on an outer side of the supporting portion 3250. The operation portion 3257 connects the insertion-extraction support shaft 3254 and the insertion-extraction pivot shaft 3253, similar to the connecting link 3255.

As illustrated in FIG. 4, when the decoupling belt unit 3200 is at the first position, a portion of the decoupling belt unit 3200 is overlapped with the vertical frame 3003 within the casing 3001 when viewed from the front side. In a state where the decoupling belt unit 3200 is at the first position, the insertion-extraction support shaft 3254 is in contact with an upper edge portion of the supporting portion 3250 on a right side of the insertion-extraction pivot shaft 3253 in the right-left direction. The first position is a position where the decoupling belt unit 3200 is overlapped with the vertical frame 3003 when viewed from the front side. In a state where the pivot mechanism 3280 is manipulated manually by the operator and the insertion-extraction pivot shaft 3253 is pivoted, the insertion-extraction support shaft 3254 pivots via the connecting link 3255 and the decoupling belt unit 3200 is pushed upward from the first position. The insertion-extraction support shaft 3254 pivots from the first position to the second position while being in contact with a lower edge portion of the front side plate 3203 and the rear side plate 3204 of the decoupling belt unit 3200.

As illustrated in FIG. 6, in a state where the decoupling belt unit 3200 is positioned at the second position, the insertion-extraction support shaft 3254 is in contact with the upper edge portion of the supporting portion 3250 on a left side of the insertion-extraction pivot shaft 3253 in the right-left direction. The second position is a position where the decoupling belt unit 3200 is not overlapped with the vertical frame 3003 when viewed from the front side. In this state, the insertion-extraction support shaft 3254 is regulated from being moved to a left side by a stopper 3256 serving as a regulation portion that protrudes upward on the supporting portion 3250. As described, by having the insertion-extraction support shaft 3254 pivot while being in contact with the lower end of the front side plate 3203 and the rear side plate 3204 of the decoupling belt unit 3200, the decoupling belt unit 3200 is pushed upward to a predetermined angle. In the present embodiment, the decoupling belt unit 3200 is pushed upward to an angle not overlapped with the vertical frame 3003 of the casing 3001.

When the decoupling belt unit 3200 is at the second position, it is not overlapped with the vertical frame 3003 when viewed from the front side. According to the present embodiment, the decoupling belt unit 3200 is pushed up to a position where the upstream side in the conveyance direction of the sheet S is at a position avoiding the vertical frame 3003, that is, to a position higher than the upper end of the vertical frame 3003. Therefore, by pivoting the decoupling belt unit 3200 from the first position to the second position, the operator may move the decoupling belt unit 3200 by sliding movement to the front side without being obstructed by the vertical frame 3003.

When moving the decoupling belt unit 3200 in sliding movement, the operator may grip a handle 3202 serving as a handle portion disposed on the front side plate 3203 of the decoupling belt unit 3200 and pull the decoupling belt unit 3200 toward the front direction. When the operator grips the handle 3202 and pulls the decoupling belt unit 3200, as illustrated in FIG. 7, the decoupling belt unit 3200 moves in sliding motion toward the front side along the pivot support shaft 3251 and the insertion-extraction support shaft 3254. That is, the pivot support shaft 3251 and the insertion-extraction support shaft 3254 function as a rail that guides the decoupling belt unit 3200 in the front-rear direction. Then, the decoupling belt unit 3200 moves in sliding motion along the pivot support shaft 3251 and the insertion-extraction support shaft 3254 until the front side plate 3203 comes into contact with the connecting link 3255. That is, the sliding movement of the decoupling belt unit 3200 to the front side is regulated by the connecting link 3255. Thereby, the decoupling belt unit 3200 will not be pulled out excessively, such that the decoupling belt unit 3200 may be suppressed from being detached from the pivot support shaft 3251 and the insertion-extraction support shaft 3254 and falling.

In contrast, when attaching the decoupling belt unit 3200 to the casing 3001, the operator may perform a procedure that is opposite to the procedure described above. In simplified description, the operator places the decoupling belt unit 3200 from the exterior to the pivot support shaft 3251 and the insertion-extraction support shaft 3254. The operator pushes the decoupling belt unit 3200 to the inner side. Then, the decoupling belt unit 3200 moves in sliding motion toward the rear side along the pivot support shaft 3251 and the insertion-extraction support shaft 3254. By having the rear side plate 3204 contact the supporting portion 3250, the decoupling belt unit 3200 is regulated from moving in sliding motion toward the front side. Thereby, the decoupling belt unit 3200 is positioned at the second position illustrated in FIG. 6. Thereafter, the operator manipulates the pivot mechanism 3280 and pivots the decoupling belt unit 3200 from the second position toward the first position (refer to FIG. 4).

As described above, according to the present embodiment, after pivoting the decoupling belt unit 3200, the decoupling belt unit 3200 is enabled to move in sliding motion toward the front side. By pivoting the decoupling belt unit 3200, the decoupling belt unit 3200 is pivoted from a position, i.e., first position, overlapped with the vertical frame 3003 when viewed from the front side to a position, i.e., second position, not overlapped with the vertical frame 3003. Thereafter, since the vertical frame 3003 will not be in the way, the operator may move the decoupling belt unit 3200 in sliding motion from the front side to remove the same from the casing 3001. As described, even though a portion of the decoupling belt unit 3200 is overlapped with the vertical frame 3003 of the casing 3001 when viewed from the front side, the operator may easily attach and detach the decoupling belt unit 3200 from the front side. That is, the workability of the operator is improved.

According further to the present embodiment, the decoupling belt unit 3200 is caused to be moved in sliding motion by the pivot support shaft 3251 and the insertion-extraction support shaft 3254 serving as rails, such that the configuration may be realized by a lower cost compared to the configuration in which a slide rail is disposed independently, and may contribute to downsizing of the apparatus.

In a state where the decoupling belt unit 3200 is positioned at the first position, as illustrated in FIG. 4 it may be designed to be supported by an eccentric cam 3252 disposed on the supporting portion 3250. In that case, the eccentric cam 3252 is fixed to a shaft-shaped member 3259 disposed rotatably on the supporting portion 3250, and the eccentric cam 3252 rotates along with the rotation of the shaft-shaped member 3259. When the eccentric cam 3252 rotates, the decoupling belt unit 3200 pivots upward in a stepwise manner. This arrangement is preferable since a relative positional relationship between the decoupling belt unit 3200 and the sheet transfer guide 2030 may be changed according to a height adjustment of the decoupling belt unit 3200, such that stable sheet conveyance may be performed between the drying module 3000 and the printing module 2000.

Other Embodiments

Figure 8:
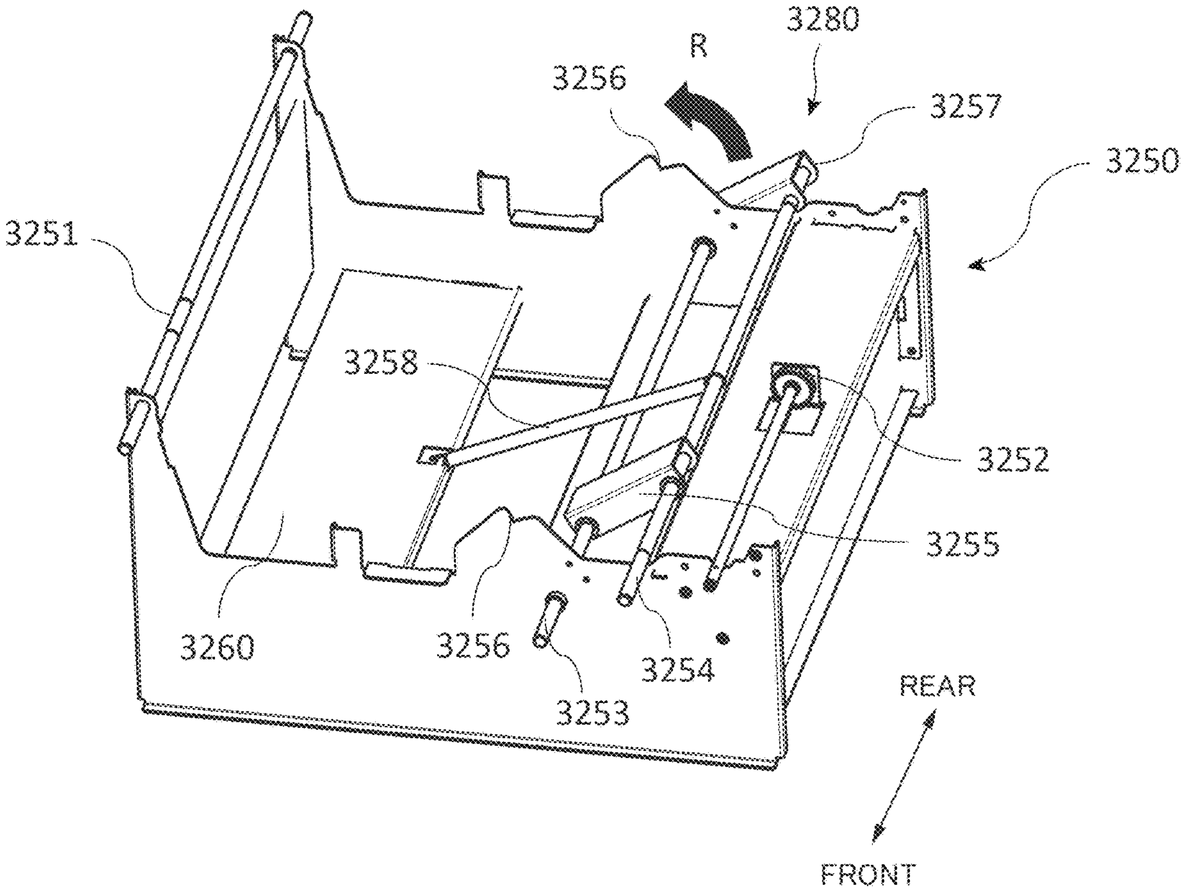
FIG. 8 is a perspective view illustrating another example of a supporting portion.

FIG. 8 illustrates another example of the supporting portion 3250. In FIG. 8, a case is illustrated where the decoupling belt unit 3200 is at a first position. As illustrated in FIG. 8, the supporting portion 3250 includes, in addition to the pivot mechanism 3280 described above, a plate-shaped reinforcement stay 3260 and a toggle spring 3258. The reinforcement stay 3260 is arranged to extend in a pivot axis direction, i.e., front-rear direction, of the pivot support shaft 3251. The toggle spring 3258 has a first end connected to the reinforcement stay 3260 and a second end connected to the insertion-extraction support shaft 3254.

The toggle spring 3258 serving as an urging member urges the insertion-extraction support shaft 3254 toward a direction drawing the same toward the reinforcement stay 3260, and supports the force pivoting the insertion-extraction support shaft 3254 when pivoting the decoupling belt unit 3200 from the first position to the second position. A rotational moment provided by the toggle spring 3258 for pushing up the decoupling belt unit 3200 is smaller than the rotational moment provided by the weight of the decoupling belt unit 3200. Therefore, the position and posture of the decoupling belt unit 3200 is not influenced by the urging force of the toggle spring 3258.

In a state where the decoupling belt unit 3200 is not attached, the insertion-extraction support shaft 3254 is positioned at the position of the stopper 3256 by the urging force of the toggle spring 3258. When pivoting the decoupling belt unit 3200 from the second position to the first position, the insertion-extraction support shaft 3254 is pivoted against the urging force of the toggle spring 3258. Thereby, the workability when attaching and detaching the decoupling belt unit 3200 may be improved.

According to the embodiments described above, the inkjet recording apparatus 100 was described as an example of the image forming apparatus, but the present technique is not limited thereto. The present technique may be applied to an image forming apparatus of an electrophotographic system using toner to achieve a similar effect as the present embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-173856, filed Oct. 5, 2023, which is hereby incorporated by reference herein in its entirety.

What is claimed is:

1. A drying apparatus comprising:

a conveyance apparatus configured to convey a sheet; and an air blowing unit disposed above the conveyance apparatus in a vertical direction and configured to blow air onto the sheet, wherein the air blowing unit includes a first pivot shaft that extends in a conveyance direction of the sheet, the air blowing unit configured to pivot about the first pivot shaft to move to an open position where the conveyance apparatus is exposed and a closed position where the conveyance apparatus is covered, wherein the conveyance apparatus includes a conveyance unit including a belt having an endless shape and configured to convey the sheet, and a plurality of stretching rollers on which the belt is stretched; and a pivoting mechanism including a second pivot shaft, the pivoting mechanism configured to pivot the conveyance unit about the second pivot shaft between a first position and a second position that differs from the first position, wherein, in a state where the air blowing unit is at the closed position, the conveyance unit is positioned at the first position, and in a state where the air blowing unit is at the open position, the conveyance unit is movable between the first position and the second position, and wherein, in a state where the air blowing unit is at the open position and the conveyance unit is positioned at the second position, the conveyance unit is configured to be drawn out to a rotational axis direction of the stretching rollers.

2. The drying apparatus according to claim 1, further comprising a casing configured to store the conveyance unit, the casing including a vertical frame that extends in a direction intersecting the rotational axis direction at a position where a portion of the conveyance unit being stored overlaps when viewed in the rotational axis direction of the stretching rollers, wherein the first position is a position where the conveyance unit is overlapped with the vertical frame when viewed in the rotational axis direction, and the second position is a position where the conveyance unit is retreated upward in a direction intersecting the rotational axis direction in the first position such that the conveyance unit is not overlapped with the vertical frame when viewed in the rotational axis direction in the first position.

3. The drying apparatus according to claim 2, wherein the plurality of stretching rollers includes a first roller that stretches the belt on a downstream side of a sheet conveyance surface of the belt conveying the sheet in the conveyance direction of the sheet, and a second roller that stretches the belt on an upstream side of the sheet conveyance surface in the conveyance direction of the sheet, wherein the vertical frame is disposed on an upstream side in the conveyance direction of the casing, wherein the first pivot shaft is disposed on a downstream side of the casing in the conveyance direction, and wherein the rail supports the conveyance unit on an upstream side of a center in the conveyance direction.

4. The drying apparatus according to claim 1, wherein the pivoting mechanism includes a rail that extends in the rotational axis direction in such a manner that the conveyance unit can pivot about the second pivot shaft, and wherein, in a state where the conveyance unit is positioned at the second position, the conveyance unit is drawn out to the rotational axis direction along the rail.

5. The drying apparatus according to claim 4, wherein the pivoting mechanism includes a connecting portion configured to connect the second pivot shaft and the rail, and wherein the rail is pivoted via the connecting portion in response to a rotation of the second pivot shaft.

6. The drying apparatus according to claim 5, further comprising an operation portion through which an operator operates the pivoting mechanism manually.

7. The drying apparatus according to claim 4, further comprising a regulation portion configured to regulate pivoting of the conveyance unit by being in contact with the rail when the conveyance unit is pivoted to the second position by the pivoting mechanism.

8. The drying apparatus according to claim 4, further comprising an urging member configured to urge the rail toward a direction separating from the vertical frame.

9. The drying apparatus according to claim 1, wherein the conveyance unit includes an engagement portion configured to engage with the first pivot shaft.

10. The drying apparatus according to claim 1, wherein the conveyance unit includes a handle portion that a user may grip so as to move the conveyance unit positioned at the second position in sliding motion.

11. An image forming apparatus comprising:

the drying apparatus according to claim 1, and an image forming unit configured to form an image on a sheet.

12. The image forming apparatus according to claim 11, wherein the drying apparatus includes a first casing configured to store the conveyance unit, wherein the image forming apparatus further comprises:

a conveyance portion configured to convey the sheet on which an image is to be formed to the image forming unit, and a second casing configured to store the image forming unit and the conveyance portion, and connected to the first casing at a position upstream in a conveyance direction of the sheet, and wherein the conveyance unit is configured to convey the sheet being conveyed from the second casing by the conveyance portion.

* * * * *